(12) United States Patent
O'Dell

(10) Patent No.: US 6,801,659 B1
(45) Date of Patent: Oct. 5, 2004

(54) TEXT INPUT SYSTEM FOR IDEOGRAPHIC AND NONIDEOGRAPHIC LANGUAGES

(75) Inventor: Robert B. O'Dell, Oakland, CA (US)

(73) Assignee: ZI Technology Corporation Ltd., Hamilton (BM)

( * ) Notice: Subject to any disclaimer, the term of this patent is extended or adjusted under 35 U.S.C. 154(b) by 0 days.

(21) Appl. No.: 09/857,363

(22) PCT Filed: Jan. 4, 2000

(86) PCT No.: PCT/US00/00135

§ 371 (c)(1),
(2), (4) Date: Jun. 4, 2001

(87) PCT Pub. No.: WO00/41062

PCT Pub. Date: Jul. 13, 2000

Related U.S. Application Data

(60) Provisional application No. 60/114,628, filed on Jan. 4, 1999.

(51) Int. Cl.[7] .............................. G06K 9/18; G06K 9/72; G06K 9/00

(52) U.S. Cl. ........................ 382/185; 382/229; 382/189

(58) Field of Search ................................. 382/173, 177, 382/179, 181, 185, 189, 191, 198, 224, 227, 229, 305; 345/156, 441, 467, 472.3

(56) References Cited

U.S. PATENT DOCUMENTS

| | | | | | |
|---|---|---|---|---|---|
| 4,251,871 | A | * | 2/1981 | Yu | ........................... 345/472.3 |
| 4,739,318 | A | * | 4/1988 | Cohen | ...................... 345/472.3 |
| 5,793,360 | A | * | 8/1998 | Fleck et al. | .................. 345/179 |
| 5,797,098 | A | | 8/1998 | Sharman et al. | |

(List continued on next page.)

OTHER PUBLICATIONS

"Prdictive Keyboard Optimized For Multiple Text Types" IBM Technical Disclosure Bulletin, US, IBM Corp. New York, vol. 38, No. 6, Jun. 1, 1995, pp. 371–372.

(List continued on next page.)

Primary Examiner—Andrew W. Johns
Assistant Examiner—Amir Alavi
(74) Attorney, Agent, or Firm—Cesari and McKenna, LLP

(57) ABSTRACT

Beginning with the first letter or stroke, this invention uses the relative frequency of the sequential groups of letters or strokes from which individual words or characters are gradually built in order to provide a better way of computer indexing languages for easier and more efficient access to both the frequently used words or characters and the less-frequently used. This makes possible a system of text input that is both more efficient and more intuitive than utilizing just word or character frequency, an input approach which eliminates typing transpositions, reduces word-spelling errors or character-stroke-order uncertainty, and provides an alternative to a standard keyboard which is especially helpful with wireless phones and hand-held computers, and similar devices lacking standard keyboards. This invention can make words and characters quite accessible in an intuitive way without requiring any direct input of words or letters, strokes or characters. The user is not directly "inputting" a word or character with letters or strokes, but finding the character or word by selecting increasingly complete words or characters from the choices offered on the computer display screen-choices offered according to the frequency-of-use not of words or characters but of these increasingly complete word or character beginnings. For Western and other non-character-based languages this greatly reduces typos and misspellings while being no slower than standard keyboard entry for many users. For Chinese-character-based languages, it provides a method of selecting characters for screen display without the need to learn any character input method, and much like one sees with standard keyboard input of Western languages, it gives positive reinforcement about entry of characters by showing the character gradually develop in response to the user's actions.

8 Claims, 9 Drawing Sheets

U.S. PATENT DOCUMENTS 6,148,104 A * 11/2000 Wang et al. ................. 382/185
6,396,950 B1 * 5/2002 Arai et al. ................... 382/181
6,738,514 B1 * 5/2004 Shin et al. ................... 382/187

OTHER PUBLICATIONS

Darragh J. J. et al.: "The Reactive Keyboard: A Predictive Typing Aid" Computer, US, IEEE Computer Society, Long Beach, CA. vol. 23, No. 11, Nov. 1, 1990, pp. 41–49.

Masui T: "An Effective Text Input Method For Pen–Based Computers" CHI Conference Proceedings, Human Factors In Computing Systems, US, New York, NY: ACM, 1998, pp. 328–335.

* cited by examiner

TEXT INPUT SYSTEM FOR IDEOGRAPHIC AND NONIDEOGRAPHIC LANGUAGES

This application claims priority from U.S. Ser. No. 60/114,628 filed Jan. 4, 1999.

BACKGROUND OF THE INVENTION

The central idea behind the use of a standard keyboard for language entry into computers or other devices is unchanged from that of the typewriter: words are built-up letter by letter, and if one wants to enter a particular letter—such as the letter 'e', for example—one strikes the 'e' key and the letter e appears on the screen directly following the display of previous input. To build a particular word, one must use the keyboard to separately enter each letter of the word, and do so in proper sequence.

When a keyboard is used for text input of an ideographic (character-based) language such as Chinese, Japanese or Korean, a character must be called to the display screen by some keyboard input related to, or even unique to, the desired character. Keyboard entry methods for these languages range from phonetic input to number codes to sequential entry of the strokes from which characters are constructed traditionally when writing with brush, pen or pencil. So, whether the language being entered with a standard keyboard is Western or Eastern, the idea is that the user is expected to use the keyboard to 'write.' That is, if 'writing' is to be displayed on the screen, 'writing' must be done with the keyboard. With respect to ideographic languages, the use of the standard keyboard can be a real barrier. Before one can use the keyboard, one must first learn a system of input—that is to say, one must learn just how the keyboard is used to tell the computer to display text on the screen. For some input methods the actual use of the keyboard is quite simple, but the user is required to learn quite a lot before even approaching the keyboard. For example, using number codes to call out the display of a particular character using a standard keyboard is easy—if one knows the correct code.

Any limitations imposed by language input with a standard keyboard are magnified when the same 'writing' input concept is adapted to the input systems employed with messaging wireless phones, and smaller and smaller portable computers which can not accommodate standard keyboards. In order to 'write' using something less than a full-size standard keyboard, other devices have been offered as alternatives: a telephone-style 10-number plus keypad, a screen-display touch pad with alphabetic displays, or an on-screen electronic writing pad. However, none of these approaches to direct language input without a standard keyboard is without its problems. The writing done with an electronic pad is often not well-understood by the computer. Using a telephone-style keypad means that each key is used for the input of more than one letter of the Western alphabet. In some implementations this means that the user must hit the key three or four times to get the desired letter. In other implementations the computer tries to guess the desired word, using frequency-of use data related to the keystroke input sequence.

In any of these efforts to provide a text input capability without a full-size keyboard, text entry is less intuitive, excellent spelling ability is more important, and in those cases where the computer is expected to guess the desired word based on frequency data, it will frequently be wrong, such as in the cases of 'cat' and 'act', or 'fig' and 'dig'. Moreover, in the frequently recurring case of a misspelling or typo, the user is not aware that an entry error has been made until the input is complete. Touch screens that require the grouping of letters in each 'touch box' have similar problems to those of the telephone-style keypad, and others as well. Touch screens that attempt to use one letter per box significantly reduce the amount of display area available for other purposes (such as the space needed to display the sentence being entered), and/or reduce the display size of the letters and/or the size of their boxes, which increases input errors on small devices. Similar problems are associated with a telephone-style keypad or a touch-pad for phonetic input of character-based languages. Written entry of these languages using an electronic pad requires a great deal of computer memory and storage, and is prone to as many or more recognition problems for the computer as is experienced with Western languages.

SUMMARY OF THE INVENTION

In brief summary, the present invention provides a text input system which may be used with computers, wireless phones or other devices or systems, and which is applicable to both ideographic and non-ideographic languages. According to one aspect of the the present invention, a user inputs text through a rapid, intuitive process in which word or character candidates are presented to the user based on frequency of use—not of full words or whole characters—but of the various sequences of letters (or strokes in Chinese-character-based languages) that are used to construct words or characters. The user need only specify the first letter or stroke of the word or character that is desired.

The sequences of letters and strokes, along with their frequency-of-use, are stored in a memory or other data storage device and may be called out as lists of increasingly complete words which are displayed to a user in frequency-of-use order. The user does not need to input particular letters or strokes, but simply choose among the increasingly more complete sequences that are offered as the word is built up by the user through the various offerings made on the display screen. The present invention operates to make frequently used words or characters quickly available at the same time that it creates efficient access to the less frequently used words or characters, and does so without the need for a full-size standard keyboard. In a preferred embodiment for devices lacking a touch screen, a standard keyboard is replaced by six keys: four arrow keys, a 'select letter group' key, and a 'select word' key. Where a touch screen is available for the device, no electromechanical keys will be needed; the preferred embodiment will be one in which the display screens will respond to a stylus. The invention could also be used with an electronic pen, or with voice, or with any other device that could call up and utilize the appropriate screens.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF ILLUSTRATIVE EMBODIMENTS

Figure 1:
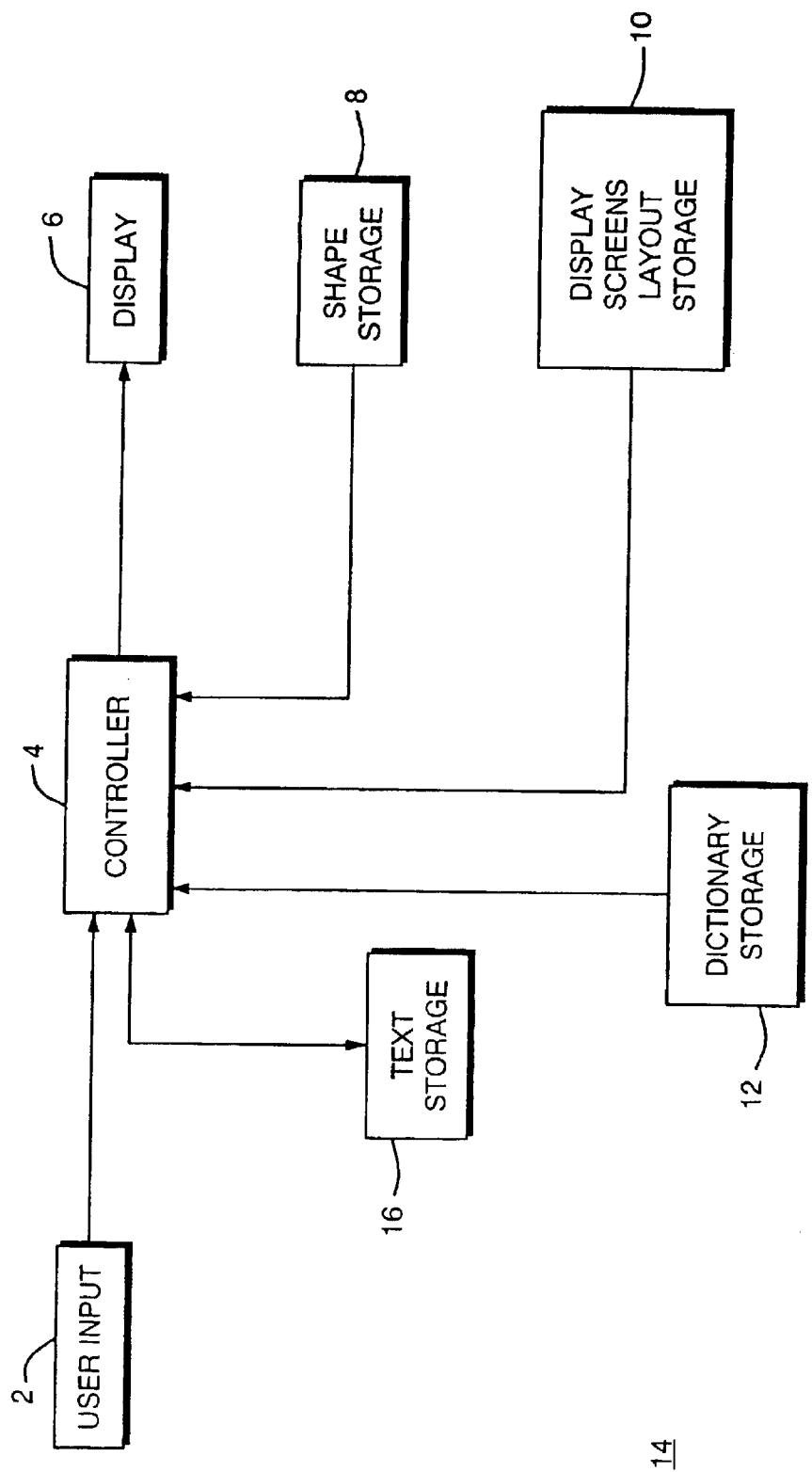
FIG. 1 is a block diagram of an apparatus for text input constructed in accordance with a preferred embodiment of the present invention.

FIG. 1 shows a text input apparatus 14 which includes a user input device 2 coupled to a controller 4, which in turn is coupled to a display 6. Controller 4 has access to data storage 8, 10, 12 in which character/letter shapes, display screen layouts, and one or more dictionaries are stored, respectively. Controller 4 also has access to text storage 16 in which text messages composed by a user (not shown) may be stored.

The hardware components needed to implement apparatus 14 (e.g., a microprocessor or microcontroller, memory or other data storage, display, and user input device) are conventional and obtainable from numerous commercial sources. Apparatus 14 may be constructed as a stand-alone device. In addition, its text input capabilities may be readily integrated into any of a variety of electronic devices including but not limited to computers, wireless phones, and television settop boxes. Generally, such integration is accomplished by implementing the text input functionality of apparatus 14, described in detail below, in a software application which is then loaded into and executed by a desired device or system.

Figure 2:
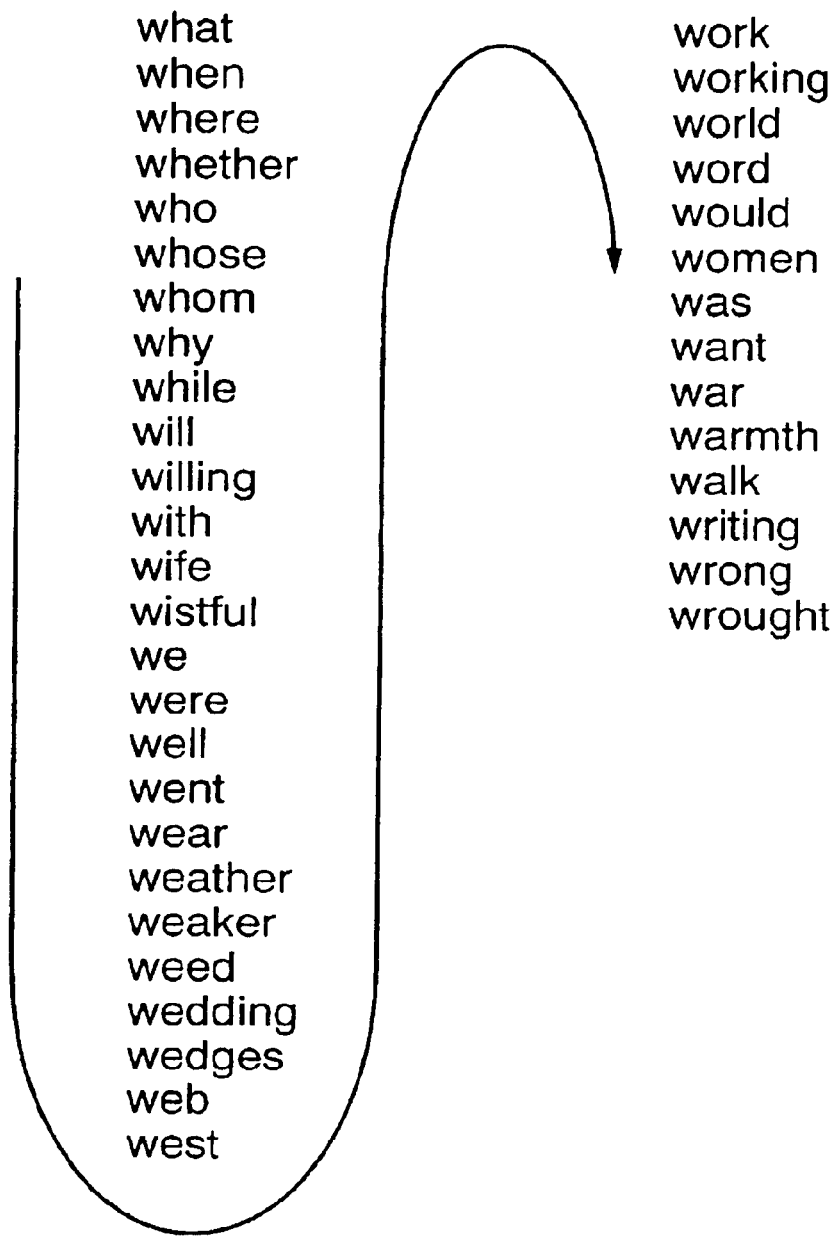
FIG. 2 illustrates the order in which certain English words are preferably stored in dictionary 12 of FIG. 1.

FIG. 2 shows a list of certain English words that begin with the letter 'w' and are preferably stored in dictionary storage 12 (FIG. 1) to enable a user of apparatus 14 to enter English text into that apparatus. It should be understood that, for purposes of clarity, only a small subset of the total number of English words that would typically be stored in dictionary storage 12 is shown. The order of the words shown in FIG. 2, which preferably corresponds to the order in which such words are actually stored in dictionary storage 12, has been predetermined as a result of a survey of the English language. The survey covered numerous contemporary publications such as major newspapers, books and periodicals and was designed to measure the frequency with which particular letter combinations are found in common usage.

As a result, it was found that English words that begin with the letter combination 'wh' appear in usage more frequently than those that begin with the combination 'we' or 'wo.' Accordingly, complete words which begin with the letters 'wh' are listed ahead of those beginning with 'we' or 'wo' in FIG. 2. Furthermore, it was found that words which begin with the letters 'wea' are used more frequently than those which begin with 'wee.' Preferably all of the words found in dictionary storage 12 are stored according to the measured frequency of usage of their particular letter combinations.

Figure 3:
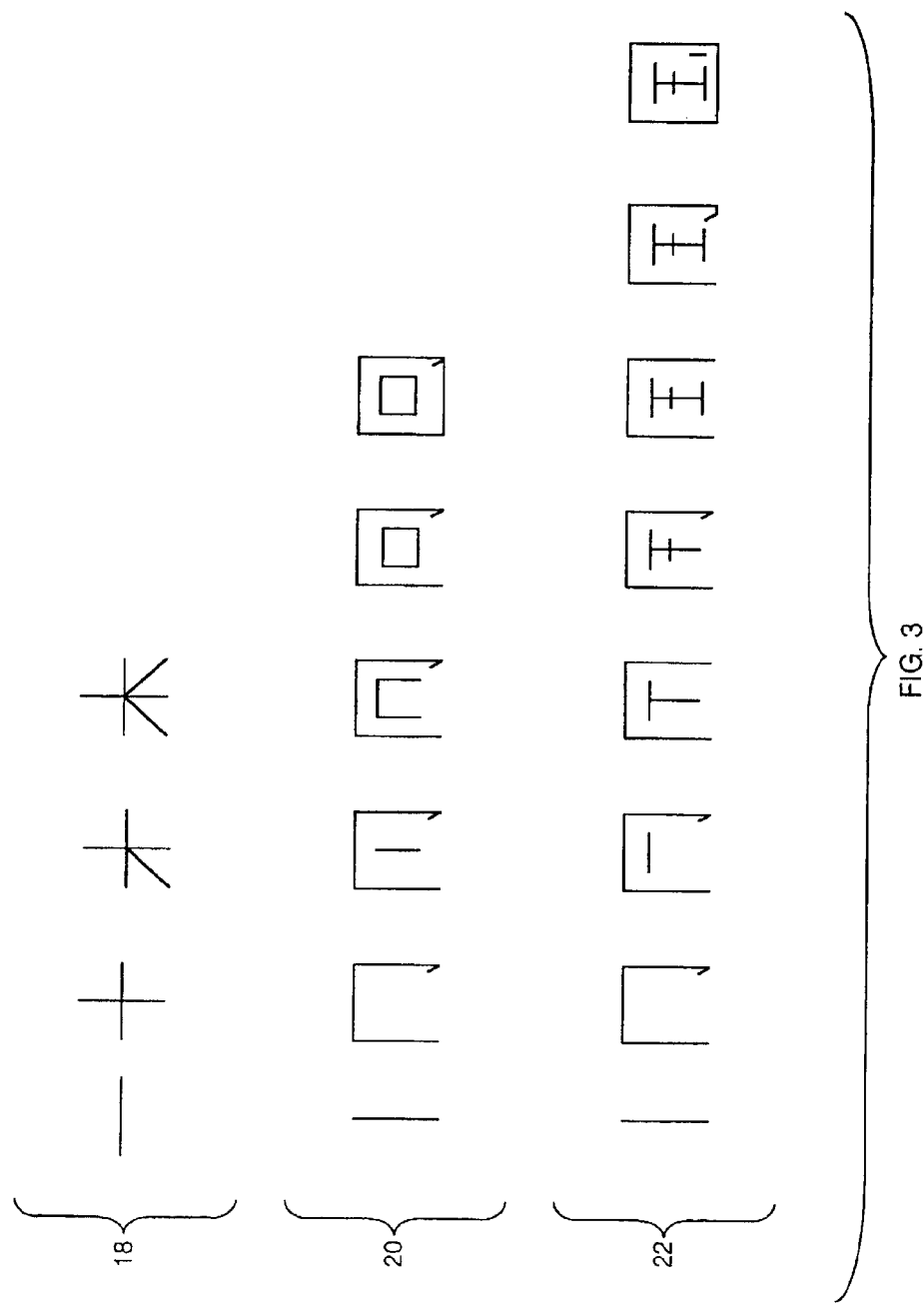
FIG. 3 illustrates the sequences of strokes or partial characters (corresponding to three Chinese characters) which are preferably stored in dictionary 12 of FIG. 1.

FIG. 3 shows the traditional, handwritten stroke sequences used to form three ideographic Chinese characters. The character denoted by reference number 18, which means "faction" or "party," is formed by a total of four strokes. The character denoted by reference number 20, which means "normal' or "usual," is formed by a total of six strokes. The character denoted by reference number 22, which means "palm of the hand" or "administer," is formed by a total of eight strokes. By conducting a survey, like that noted above, of contemporary Chinese language publications, it is possible to determine frequencies of usage of all possible sequences of strokes, in effect treating the individual strokes as analogous to letters. Following this methodology, one may then rank the approximately 8,000 characters commonly used in Chinese by order of frequency of usage. Again, the frequency of usage is not that of the whole character (analogous here to a whole word), but of the particular sequence of strokes found in a particular character as measured against all stroke sequences found in the language.

It should be understood that an appropriate survey may be conducted against language of interest to determine the necessary frequency of usage information to enable one to properly order the words of that language in accordance with the present invention.

Figure 4:
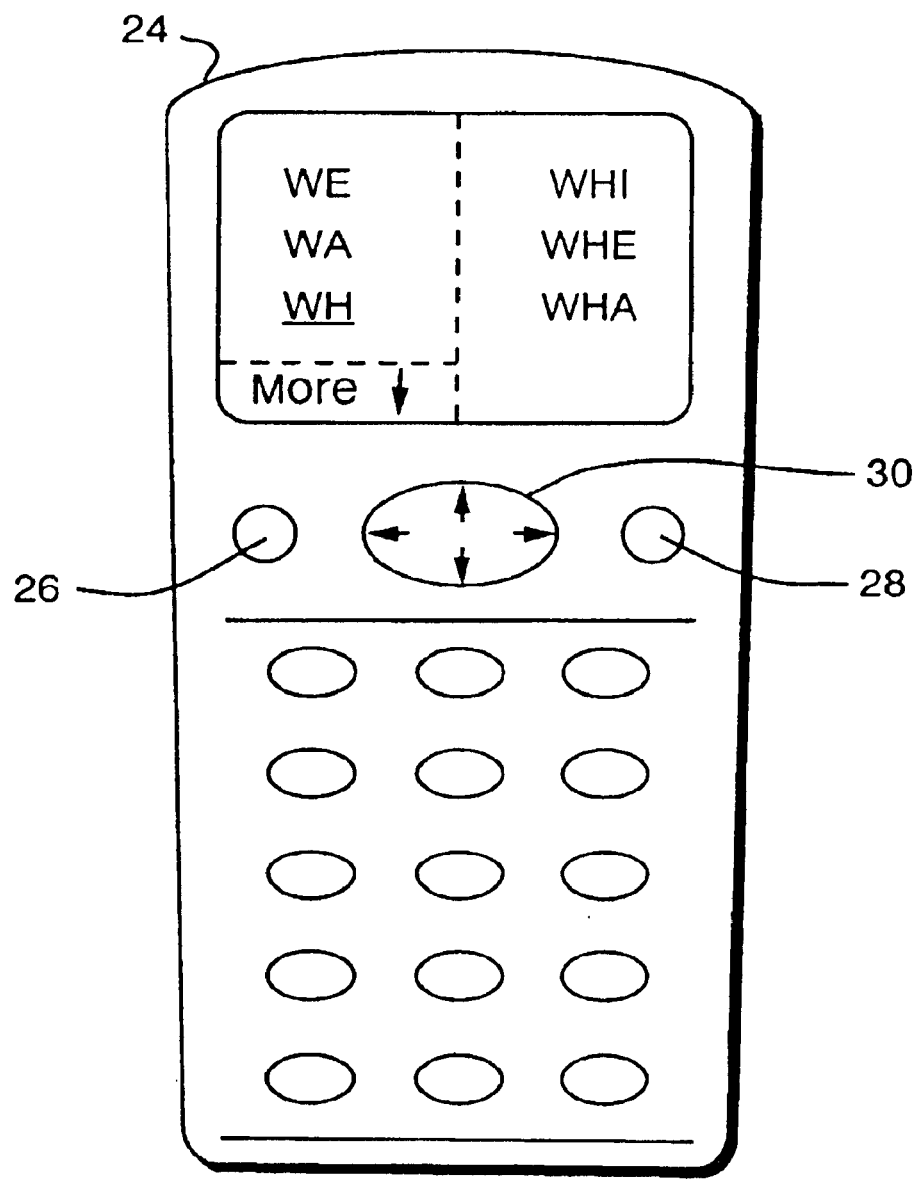
FIG. 4 shows the face of a wireless phone which provides six keys, four arrow keys, a 'select word' key and a 'select letter' key, to allow text input in accordance with a preferred embodiment of the invention.

FIG. 4 shows the preferred embodiment of a wireless phone 24 which incorporates the present invention to enable a user of the phone to compose text messages for transmission by Short Message Service (SMS) or any of a variety of other commercially available text messaging services. In this embodiment, only the keys denoted by reference numbers 26, 28 and 30 are needed to perform text input. When a user selects text input mode, key 30 functions as a four-way cursor control key. Key 26 functions as a "select letter group" or "select stroke group" key, and key 28 functions as a "select word" or "select character" key. The specific functions of each of keys 26, 28 and 30 is described below in connection with FIGS. 6–8.

Figure 5:
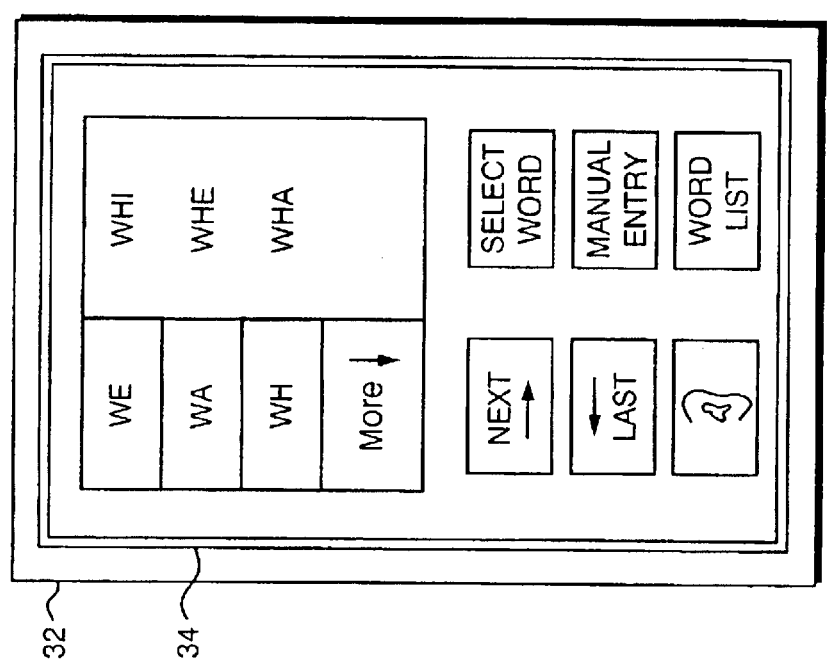
FIG. 5 shows the face of a palmtop computer or similar device which includes a touch screen to allow text input in accordance with a preferred embodiment of the invention.

FIG. 5 shows an alternative embodiment in which the present invention is integrated into a palmtop computer 32 having a touch display 34. In this embodiment, the necessary function keys are provided as "softkeys" or areas of the display itself.

Figure 6:
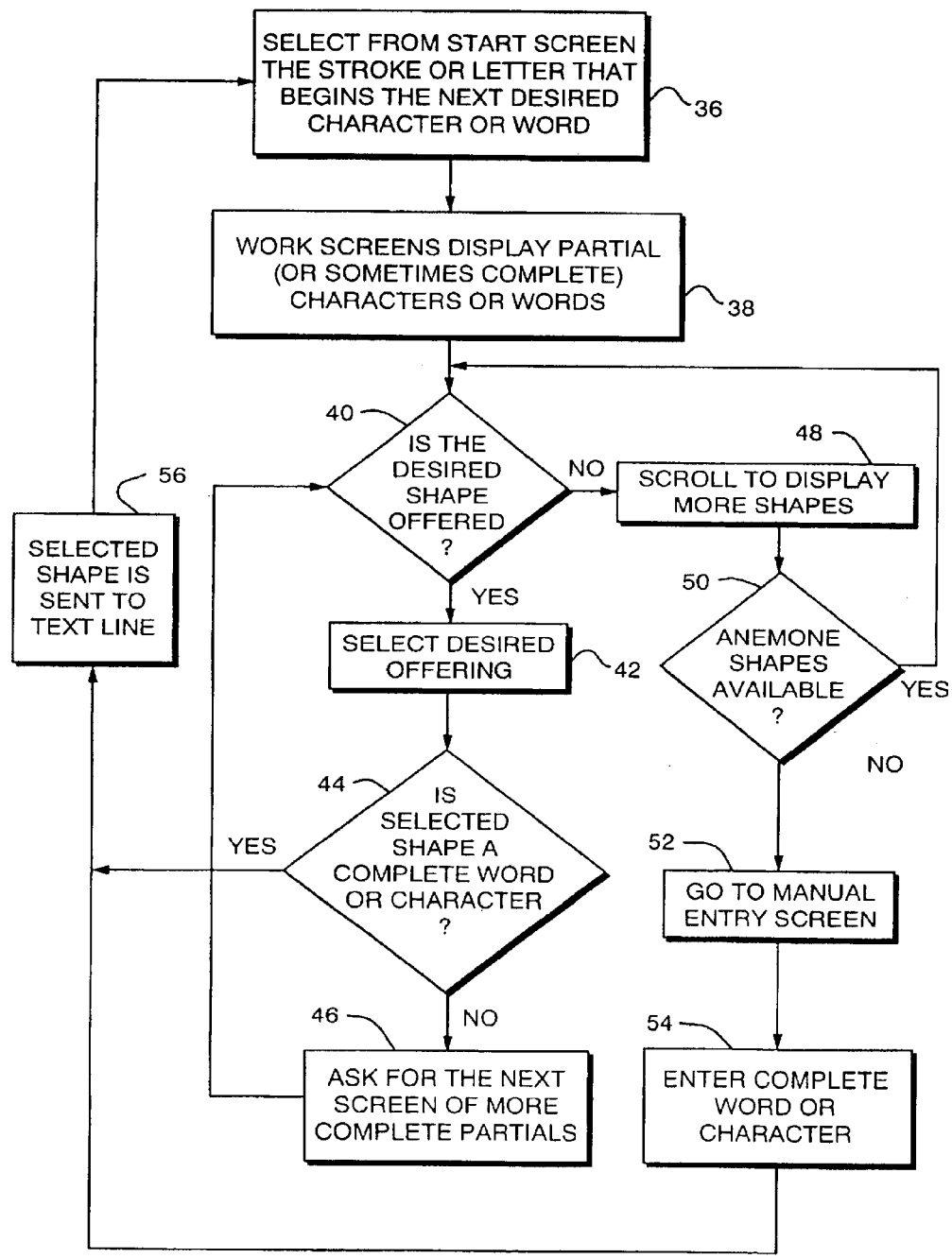
FIG. 6 is a high level flowchart illustrating the overall operation of a text input system in accordance with a preferred embodiment of the present invention.

With reference now to FIG. 6, the overall operation of the present invention will be explained. In a preferred embodiment, there are six kinds of screen displays:

1) The 'Start Screen', examples of which are shown in FIGS. 4, 5, 7A and 7B. It displays the alphabet in frequency-of-use groupings as well as punctuation selections, a caps-on caps off selection toggle, and a selection that will display the 'Special-Functions' screen where less frequently used functions—such as entering text manually or reviewing previously entered text—are available. Since, for example, the letter which most frequently appears in written English as the first letter in a word is 't', the default position of the cursor when using the invention for the English language is on the letter 't'. The other letters most frequently appearing as first letters in words are grouped closer or farther from 't' according to frequency-of-use as first letters. After a word is selected from a 'Work Screen', the user is automatically returned to this screen. After a starting letter is selected from this screen, the user is automatically taken to the appropriate beginning 'Work Screen'.

2) The 'Work-Screens': each is preferably a two column, vertically split screen which displays the various letter groups of word beginnings—which can sometimes include one or more complete words, such as 'we' or 'who', for example. Several examples of of work screens are shown in FIG. 7B.

3) The 'Word-List Screens': each preferably displays lists of complete words that begin with specific letter groups. In a preferred embodiment, the related word list for any letter group on which the cursor rests can be accessed from any work screen at any point in word entry by simply pressing a key.

4) The 'Manual Entry Screen' displays the alphabet, punctuation marks, the numbers 0–9, and a caps-no-caps toggle, and is used for manual input to complete a word or to create it from the beginning. It can be accessed from the 'Start Screen' or from any 'Work Screen'. This screen is ordinarily used only for words that do not appear in the device's dictionary or words that the user spells in a nonstandard way.

5) The 'Special Functions' screen, which provides access to such functions as modifying or erasing previously entered text files, modifying earlier portions of the present text file, or accessing the 'Manual Work Screen'. It can be accessed form the 'Start Screen' or from any 'Work Screen'.

6) The 'Text Line' which is not a separate screen, but a boxed, scrollable upper portion of all other screens; it shows the text that has just been entered—either all of it, depending on its length, or the most recent portion of it.

At step 36, a user selects from the Start Screen the stroke or letter that begins the character or word of interest. In response, at step 38, the user sees a Work Screen on the display that contains characters or words that begin with the previously entered stroke or letter. At step 40, if the desired character or word is not present on the display, the user advances to step 48 and scrolls (using the cursor control keys) to view additional characters or words in the current Work Screen. A loop may be established through step 50 as the user continues browsing the current Work Screen. If the user exhausts all possibilities with the current Work Screen, he or she may at step 52 jump to the Manual Entry Screen to complete the character or word manually at step 54. After manually completing a character or word (e.g., by explicitly selecting the missing strokes or letters), the user places it on the Text Line at step 56 by actuating the "select word" or "select character" key (FIGS. 4 and 5).

Returning to step 40, when the initial Work Screen displays the desired shape (partial character or word), the user selects same at step 42 by actuating the "select letter group" or "select stroke group" key (FIGS. 4 and 5). Next, at step 44, if the selected shape is the desired complete character or word, the user places it on the text line by actuating the "select word" or "select character" key. Otherwise, the user advances to step 46 and is presented with the next successive Work Screen based on the strokes or letters previously selected.

The prompting done by the larger letter groups shown in the 'look-ahead' right hand portion of Work Screens and the ready access to Word Lists will reduce or, often, eliminate the need for manual entry caused by spelling problems. But a screen of individual letters—the Manual Entry Screen—is also available for use as a means of entry at any point in the process for those cases in which the user discovers that the word does not appear in the dictionary storage, or where the user has little or no idea of how the word begins or is uncertain at any point of how it continues. Manual entry is done letter by letter until the desired word or character is complete, at which point the user asks for it to be sent to the text line by pressing the key that indicates that a word has been selected. The system may optionally compare any such entry to a list in dictionary storage of common misspellings and suggest a corrected spelling where possible. In another option, in the case of entry of known homophones, the computer will display an 'ear' icon (FIG. 5), which, when selected, will show one or more of the entry's homophone(s) [such as words like 'great' and 'grate'] and list the meanings of each word. The system may also unobtrusively show the 'ear' icon whenever homophones are entered via the Work Screens in the usual manner.

While the preferred embodiment displays all the single letters with which words begin on the 'Start Screen' in a frequency grouping, it is, of course, possible to display them all on the same screen in an alphabetical order or in any other order. They could, in fact, be made scrollable by frequency. A similar adjustment could be made for the Work Screens, where the columns of letter groups could be displayed alphabetically, or in a combination of alphabetic and frequency lists—or in any other groupings. Or, they could be presented one at a time, requiring a yes or no response to each offered group.

Figure 7A:
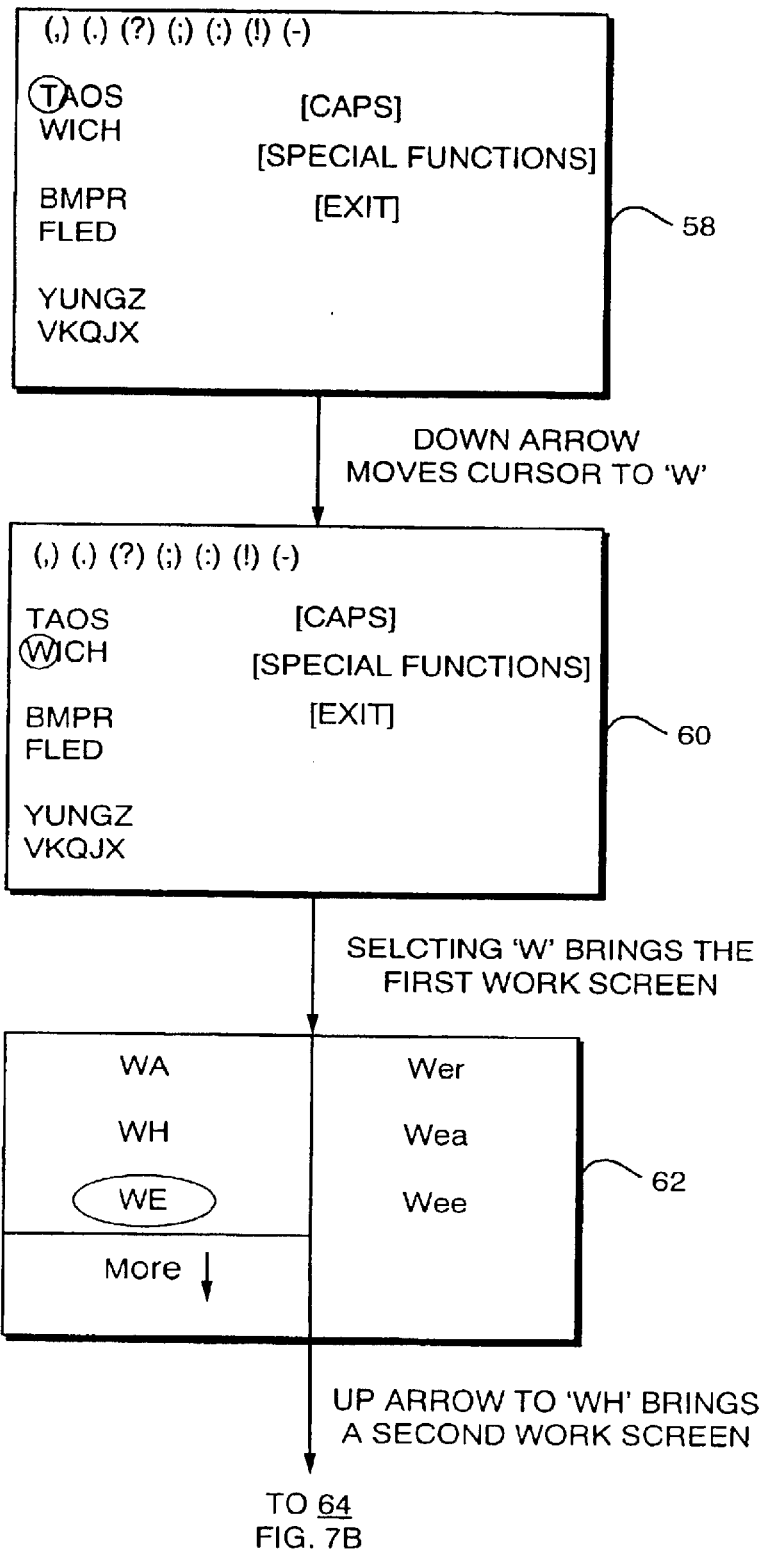
FIGS. 7A and 7B show a series of sequential screen displays which illustrate the functioning of the invention for alphabetic and other non-character-based languages.
Figure 7B:
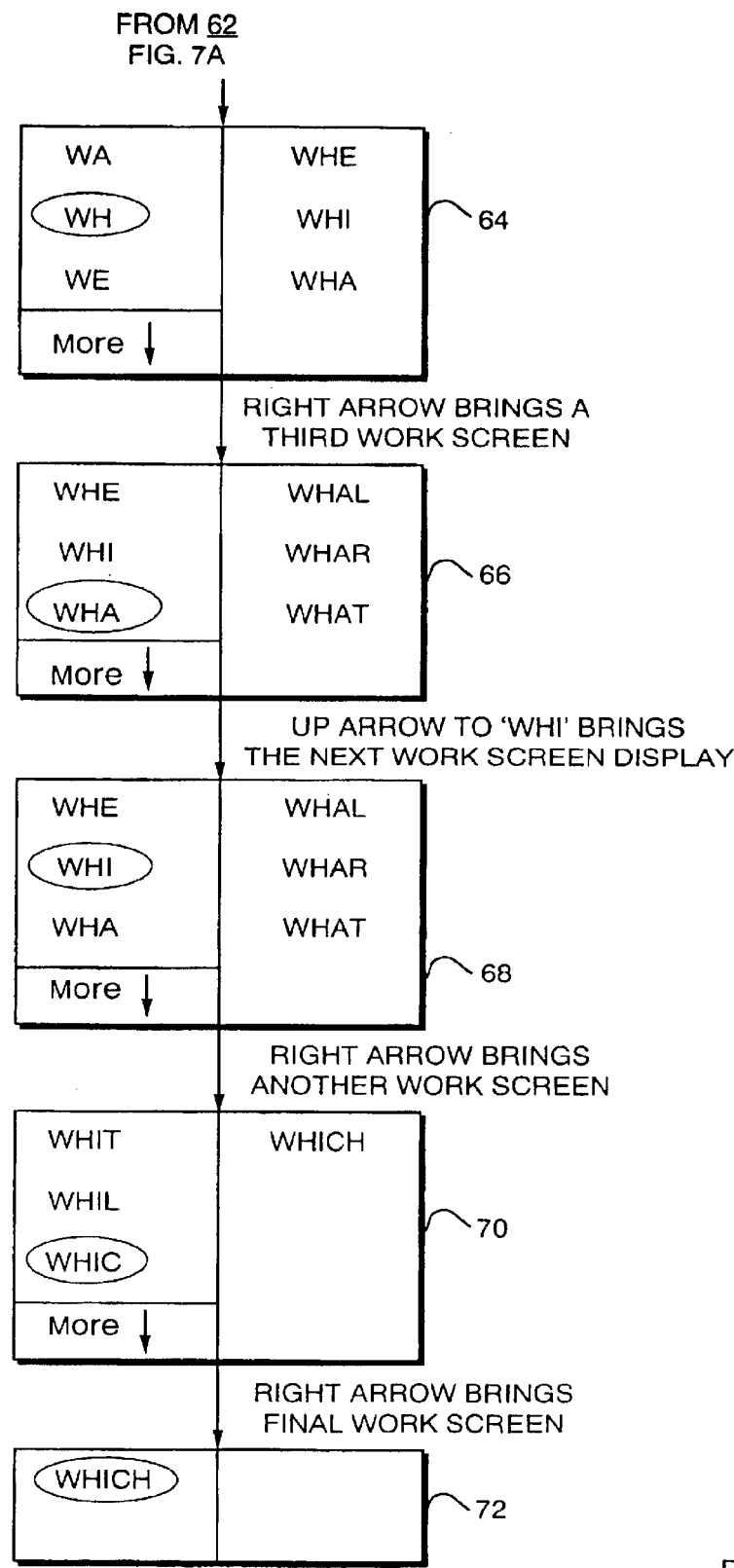

With reference now to FIGS. 7A and 7B, an example of the detailed operation of the present invention will be explained. On the Start Screen denoted by reference number 58, the cursor (denoted by a circle) is positioned on the letter 't.' A user wishes to find a word that begins with 'w' and uses the down cursor arrow to move the cursor onto that letter as shown at 60. The user then actuates the "select letter group" key, which causes the system to display the first Work Screen, the Two-Letter Screen at 62. It is split vertically into two columns, with the left-hand portion showing (in frequency-of-use order) a single column of all the possible two-letter beginning combinations for words starting with 'w'; the cursor is resting on the statistically most likely candidate. The user can move the cursor through this list with the up-down arrow keys, and can scroll the list if it is longer than the usual screen display—which will be indicated in some way—such as the word 'more' at the bottom of that portion of the screen, with an arrow pointing downward.

The right-hand portion of this Two-Letter split screen displays a list of all the possible three-letter word beginnings that start with the two-letter group on the left hand portion of the screen where the cursor rests. When the cursor is moved [with the use of the up-down arrow keys] to a different two-letter group in the left hand column, the three-letter groups in the right hand column change accordingly. For example, if the cursor is resting on 'we' in the left hand column, all the three-letter groups in the right hand column start with 'we' and are shown in frequency of use order, but if the cursor in the left-hand column is moved to 'wh' at 64, then the right column displays the three-letter groups beginning with 'wh'. So, if the desired word is 'which', and if the cursor is resting on 'wh' in the left hand column, the user will see that 'whe' is one of the choices in the right-hand column. Then by using the right-arrow key while the cursor rests on 'wh', he causes the display to change (ostensibly to move left) so that the left-hand portion of the screen now shows the Three-Letter Screen 66 on which the three-letter combinations that had appeared in the right-hand portion of the previous display now in the left hand portion of the screen, while a group of four-letter word beginnings are now shown in the right hand portion of the screen.

If the user moves the up-down arrow keys to the desired three-letter group 'whi', seen in the column on left-hand portion of the screen, then the four-letter combinations beginning with 'whi' appear as the new column in the right-hand portion of the screen 68. One of the four-letter combinations is 'whic'. So, to continue with the input of 'which', the user then presses the right-arrow key to access the Four-Letter screen. Now this display shows a screen 70 with the four-letter groups including 'whic'—now in the left portion of the screen, and a five-letter group in a column in the right-hand portion of the screen. The five-letter group includes 'which'. And, when the user then presses the right-arrow key again, 'which' and any other letter groups in that five-letter column are now seen in the left portion of the Five-Letter screen. Then, when the cursor is resting on 'which', the user selects it at 72 by pressing the 'select word' key, which adds the word to its sequential place in the Text Line, and returns the user to the 'Start Screen' where he can access punctuation, start a new word, or perform other functions—such as ending the input session.

At any time in this word-building process, the user can return to the previous display by simply hitting the left-arrow key. And, if at any point the user does not find the desired letter sequence among the offered letter groups—which can mean either that the user is unfamiliar with the standard spelling of a word or that the sought word is not in the device's storage—then the user can go directly to the Manual-Entry screen—by selecting the ME icon from a scrollable display accessed in the upper limit of the left portion of any Work Screen by using the up arrow key—and complete the word.

To assist further with spelling problems and as an aid to faster entry for some users, the user can—by clicking a 'WL' icon in the top of the left hand portion of any Work Screen—access a scrollable list of words that begin with any displayed letter group. The list shown will begin with the letter group on which the cursor is resting at the time the 'word list search key' is pressed, and will be displayed in frequency-of-use order—at least those words whose frequency of use is great enough to be likely to be helpful to the user—or in alphabetical order or in a combination of the two. Any word on these lists can be sent to the text line by simply moving the cursor to it with the up-down arrow keys and pressing the 'select word' key. The user can abandon the search and return to the previous work screen at any time by simply hitting the left-arrow key.

In the example discussed above, the desired word 'which' is not selected until its appearance on the Five-Letter work screen by which time it has been tracked letter-by-letter until it is complete. It should be understood that this is not the only way in which words can be accessed, nor always the most efficient nor the least confusing for the user. Wherever possible and appropriate the process might automatically jump directly from a three letter group to a five or six letter group; in other words we are not restricted to Work Screens that move only letter by letter. And we can choose to let the user simply select from a list of likely completed words at any point, words of various lengths, if desired. These can be shown in the right hand portion of the screen, moved to the left hand portion in the usual way, where they will be scrollable, and the sought word can be selected; they can be arranged alphabetically, or according to frequency within the offered group, or a few offered based on very high frequency within the offered group and the rest listed alphabetically.

The Compound Word Feature for Alphabetic Languages

In English and other alphabetic languages it is common to follow one word with another in order to create a second but usually associated meaning—as in 'water supply' or 'water buffalo'. Consequently, in order to increase operator efficiency, the preferred embodiment of the invention offers this next word placing it parenthetically at the top of the column in the left-hand portion of the work page. For example, if, following the word 'water', the first letter offered for the next word is a 'b', the 'next-candidate word' offered could be 'buffalo'. The user can access it by using the up-arrow, or, if it is not wanted, can ignore it, and it will go away when user action has shown that the search is for a different word. This is also employed for frequently used groups of three or more words as well—commonly used phrases such as 'out of the way'. Sometimes in English the second word is normally separated by a hyphen—as in 'water-repellent', at other times by a space—as in 'water supply', and at other times is not separated at all from the first word—as in 'waterwheel'. And for many such situations, most people will not always be sure of just what the accepted form should be.

This invention minimizes such problems by applying the compound feature to all of them. In the preferred embodiment, a word such as 'blackboard' where there is neither a space nor a hyphen present in the accepted form, the word can be called out both by the usual method and by the compound method. That is to say, if the user accepts the word 'black' and then begins to enter 'board', the computer will understand at the point that 'bo' is accepted that the user may want the word 'board'; the computer will then offer the word 'blackboard'. If 'blackboard' is accepted by the user, it goes to the text line as a single word, replacing 'black'. If ignored, it goes away. If such a word should be hyphenated, it will appear in hyphenated form, both when offered and, if accepted, on the text line. If the word is hyphenated in the accepted form, it will appear as such on the work screens. But, if the first part is accepted as a separate word, and the second part of the hyphenated word is offered by the compound feature and accepted by the user, then the entire hyphenated word replaces the accepted first part of the word in the text line.

Chinese-character-based Languages

This invention handles the Chinese characters used in Chinese, Japanese and Korean in much the same way that it handles the words used in other languages, such as in the example given above for English. The appearance of the screen displays is naturally different, since we are dealing with characters and the beginning stroke groups of characters rather than with words and the beginning letter groups of words, but the basic idea is the same. And, for accessing characters, it is both more frequently possible and often desirable to have work screens that move in increments of more than one stroke at a time. The pace at which the work screens move in the development of the desired character can be built to vary from character to character and even within the development of the same character. Sometimes it might be stroke by stroke, sometimes the difference between the left hand portion of a Work Screen and the right hand portion might be one stroke, other times two, three, four or more, depending on what has been deemed most efficient and easiest for the user. And, at some point, it might be helpful to display for selection one or more complete characters, ranked by their frequency within the offered group. Chinese:

Chinese characters are made of strokes rather than letters, but, as with the use of letters in making words, there is a traditional sequence in which they are to be laid down when making any given character. For example, the character for tree or wood is made up of the following strokes laid down in the traditional order. [See the first illustration in FIG. 3]. And there are many other, more complex, characters that begin with the character for tree—where the character for tree is a kind of 'prefix'. The analogy with English for these 'stroke group prefixes' would be that 'act' is by itself a word, but is also the beginning of other, longer words, for example, 'action', 'activate', 'actor', 'activity', and actual. And, the character for tree also begins with a two-stroke group which is a common beginning for an even greater number of characters than are begun with the 4-stroke group that is used for tree. And, to continue the analogy with English, the two letter group 'ac' that begins the word 'act', is the beginning of a great many more words than are begun with 'act'.

But, again, as with English words, the number of characters with which a stroke group begins is not the point. The point is how many times that beginning stroke group can be expected to appear in text—its frequency-of-use. It is possible that it appears with high frequency only because of the frequent use of one or two characters—even though it may appear as the beginning of dozens or even hundreds of characters. Or even if none of the characters that began with that stroke group are used frequently, any of its beginning stroke group sequences could have a high frequency of occurrence if it is a beginning stroke group sequence of a large number of such characters. It is also possible that a character that is used quite frequently starts in a way that few other high frequency characters do, and so has a beginning stroke group sequence with only moderate, or even low, frequency of use. This means the character will emerge more quickly, since few others with its beginning stroke group sequences have a significant frequency-of use.

So, as with English, we first make a survey of a large amount of printed material to determine the frequency-of-use of the various beginnings of characters. With this information, we can build the 'Start Screen', the 'Work Screens' and the 'Character List Screens'[analogous to the 'word list' screens for English] for all the characters in our device's dictionary.

As with the English example, in the preferred embodiment we use only four arrow [cursor] keys, an 'access character' key [analogous to the 'access word' key for English] and a 'Select Character Key' [analogous to the 'select word' key for English]. And, as with the English example, we can also use a touch screen, as well as any other methods of selection that lead the user from screen to screen and select characters and strokes.

Figure 8:
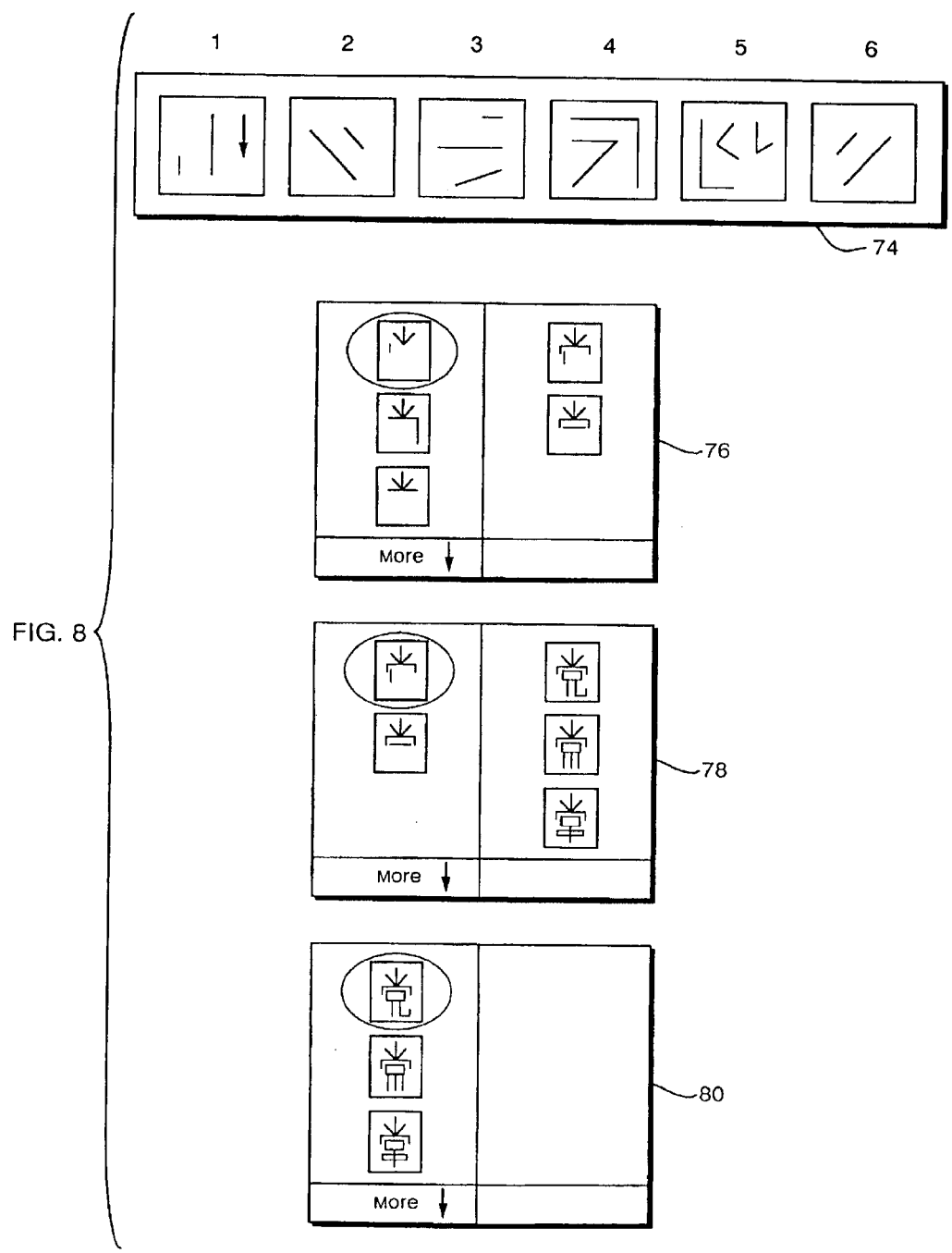
FIG. 8 shows is a series of sequential screen displays which illustrate the functioning of the invention for Chinese-character-based languages.

In a preferred embodiment, the Start Screen for Chinese appears as denoted by reference number 74 in FIG. 8. In this embodiment, the Start Screen displays not strokes but six stroke categories, with the cursor resting initially on the category for horizontal [straight left to right] strokes, the category with the highest frequency-of-use for the first stroke used in making Chinese characters. When one of these categories is selected, the user is taken to an initial work screen such as screen 76. Work Screen 76 is split vertically and displays two columns of incomplete characters which offer in the left-hand portion of the screen a display of possible two-stroke groups, of which the first stroke in each group is a stroke from the stroke category selected on the 'Start Screen'. In the right-hand portion of the screen is a display of possible three stroke groups which begin with the two stroke group on which the cursor is resting in the left-hand column; as with the English example, these stroke groups change accordingly with any change in the location of the cursor in the left hand column. The groups in each column are arranged in frequency-of-use order.

Since Chinese characters are constructed in two dimensions rather than in the single dimension used with non-character-based 'linear' languages, it is useful to the user to know not only the stroke but also its size and its location in the imaginary box within which a Chinese character is constructed. One of the most helpful features of this invention is that it can offer that information. Starting with the first work screen [which has character beginnings composed of at least three-strokes], every 'Work Screen' will show a series not just of possible beginning stroke groups, but beginning stroke groups in their appropriate locations in a particular area of the imaginary box. See the Work Screens 2,3, and 4 of FIG. 2.

The preferred embodiment for Chinese character input has the following screen displays.

1) The Start Screen display shows six stroke categories used for making Chinese characters. It also has punctuation symbols and access to the Special Functions Screen and the Manual Entry Screen. It should be understood that this screen could utilize more, fewer or different stroke categories or could use no categories at all—simply showing the variety of beginning strokes in their actual sizes and locations, ordered according to frequency-of-appearance as the first entry stroke in all the characters in the device's computer storage that are employed when writing the language.

2) The Work Screens are split vertically into two parts, the first of which for any character search typically shows a column of beginning two-stroke groups in the left hand portion, and a column of stroke groups in the right hand portion comprised of three strokes—or perhaps more, where it is both useful and not confusing. As the cursor in the left hand portion moves vertically from one stroke group to another, the groups of three (or more) stroke groups in the right hand portion of the screen change accordingly, since they are sequentially related to the two-stroke group on which the cursor rests. To move the cursor from the left hand portion of the screen so as to select one of the related stroke groups in the right hand portion, the user presses the right arrow key, which ostensibly replaces the two stroke group in the left hand portion of the screen with the three-stroke groups showing on the right, and shows a column of four-stroke groups in the right hand portion of the screen. Any one of these stroke groups can be larger than the expected wherever such larger stroke groups among the two, three, four strokes groups are useful and not confusing. [As shown in some parts of the work screens of FIG. 2.] In other words, the difference in the number of strokes between the groups on the left and those on the right must be at least one stroke but can be more, where helpful.

3) The Character List Screens, analogous to the 'Word List' Screens in English, can be called up from any Work Screen, and are automatically provided at an appropriate point in the process—often after stroke groups of only four strokes. These screens are lists of characters whose beginning stroke groups are the same as the stroke group on which the cursor is resting in Work Screen. They are listed in the order of frequency-of-use within the presented group.

4) The Manual Entry Screen offers a means of entering the character phonetically. In Chinese, phonetic entry can be done with either Bopomofo or Pinyin. With Japanese, there is a display of the traditional a 'fifty sounds table' with which one can choose the appropriate Kana characters needed to spell a character phonetically, or, alternatively, to give it its proper inflection, for example. The other special characters—such as the okurigana—are also available on this screen. In the cases of both Chinese and Japanese, phonetic input can be displayed phonetically, or, if a character is desired and is available in the device's storage, the character can be displayed after it is spelled out and selected from among homophone candidates. In the case of Korean, Hangul will be available on the manual input screen as the phonetic alternative to creating Korean's Chinese characters directly. Punctuation marks, the numbers 0–9, and the Western alphabet are also available on the Manual Entry Screen for each of these languages. This screen can be accessed from the Work Screens, the Start Screen and the Special Functions Screen 5) The 'Special Functions Screen', which provides access to such functions as a means of modifying or erasing previously entered text files [such as unsent e-mail messages], modifying earlier portions of the present text file, or accessing the 'Manual Work Screen'. It can be accessed form the 'Start Screen' or from any 'Work Screen'

6) The 'Text Screen' which is not a separate screen, but a boxed, scrollable upper portion of all other screens shows the text that has just been entered—either all of it, depending on its length, or the most recent portion of it.

As with Western alphabet input, this invention could function quite well for Chinese- character input using four arrow keys, a 'select stroke key' and a 'select character key', but another very effective embodiment would, as noted above, employ not conventional electromechanical keys but a touch screen wherein particular rectangular areas of various sizes some of whose displays, would change when touched with a stylus in the proper sequence. In effect, it would be a keyboard where both the look of one or more of its keys [or 'key areas' or 'soft keys'] and the function the keys perform in helping the user choose a character can change whenever one of the screen's 'key areas' is pressed by the stylus.

It is also a feature of this invention that it is possible—using stroke categories keys similar to those shown in FIG. 8 that are made available in the Manual Entry Screen—to input a desired character using only the stroke input selection and traditional stroke order. It is also possible to make versions of this invention where the user is taken to the first work screen after only one stroke is selected from the start screen, or one in which two strokes are required—or more. And it is possible to let the user decide how many he will start with, by letting him set a default, or by making the user ask for the first work screen when ready by selecting an icon on the start screen, or using the 'word select' key. It is also possible to create an embodiment that lets the user input strokes throughout the entry process or at any point in the process by allowing the input of the next stroke (or the next letter in the case of alphabetic languages) rather than an arrow key or a touch screen action to move the input process from one work screen to another.

With reference again to FIG. 8 the user has input two strokes which then leads him to the first Work Screen denoted by reference number 76. On the right of the screen, is displayed the only two possible larger incomplete characters beginning with that stroke group. The user sees that the top one of the two offered. is the correct start of the desired character, and uses the right arrow key to advance to the Work Screen 78—where the cursor now rests on the next desired incomplete character, showing three possible complete characters in the right hand part of the screen. [It would, of course, be possible rather than going directly to completed characters at this point, to build these choices more slowly—even stroke by stroke, which is both necessary and less confusing for some parts of at least some characters.] Another right arrow brings the right hand display of screen 78 into the left hand part of the display of Work Screen 80 with the cursor resting on the sought character—which happens to be the most statistically likely. The user selects this character by pressing the 'select character' key, which sends the character to the text line, and returns the user to the Start Screen. If the sought character was not among the three displayed on work screen (3), others with the same beginning can be accessed by using the down arrow to send the cursor to the bottom of the left hand part of the screen where the other characters can be scrolled into view.

Icons on the work screens accessible by pushing the up arrow past the top limit of the display will make it possible for the user to access the Manual Entry Screen or a likely character list at any stage of input. The user can return from any work screen to any previous work screen by pressing the left arrow key.

The Compound Feature for Chinese Characters

About one-third of all characters appearing in written Chinese are part of a compound—that is to say, where two or more characters are used together to create a particular meaning different from the meaning of the characters when used singly. For example, the character for fire followed by the character for mountain means neither 'fire' nor simply 'mountain', but, as we say in English, 'volcano'. This allows the invention to anticipate second or subsequent characters in selected compounds wherever the Start Screen stroke selection suggests the possibility, and then to offer a different set of work screens wherein any possible second or subsequent characters are given a higher priority than usual. It should be understood that it would also be possible to simply offer a list of possible characters, even if in many cases it would be less useful to the user. Japanese:

Japanese has four sets of characters; the Kanji, which are their own set of 'Chinese' [or Han or Kan] characters; the Hiragana, the cursive set of their 46 character phonetic syllabary; the Katakana the angular set of their 46 character phonetic syllabary [the two are collectively referred to as 'the kana ']; and the Western alphabet, which is used only rarely—usually in reference to institutional names, including acronyms.

Kanji is accessed in the same way as the characters in Chinese. Character compounds are also handled in the same way as that described for Chinese. Since Japanese is an inflected language, and often needs to use kana after particular characters, all Work Screens that contain complete characters, and all Word List Screens will contain an icon which, when selected, will offer candidate kanas that can be added to the selected character. The kana normally included in particular character compounds will be offered—appropriately placed—along with the compound character (s).

Other kana entry and Western alphabet are accessed from Manual Entry Screens. Their are two kana screens, one for katakana, and one for hiragana. The 46 characters of each syllabary is laid out in the format provided by what is traditionally called the 'fifty sounds table'[although it is now 46 sounds]. In any device where the display screen is so small as to make it difficult to properly see or access either version of the kana on a single screen, the display will scroll. Access to symbols which are often needed to indicate a different pronunciation [such as the daku-ten, the furigana, the reduced size of some kana used in making the 'twisted sounds'] as well as other symbols—such as repetition symbols—are also provided on the manual screens, just as they are on the Start Screen [where indications of any sound differences for kana just entered via a Work Screen can be made before the next Kanji character entry is begun] If the user forgets to add them to the kana called out via the Manual Entry Screen, they can also be added at the Start Screen before the next Kanji entry is started. Korean:

Korean also has its own sizable set of 'Chinese' characters [Hanja], but, in practice, almost all writing is done with its alphabet, Hangul, which has 24 different symbols. The ten 'vowels' are comprised of from one to three strokes that are mostly various arrangements of long verticals and short horizontals; with two exceptions, the 'consonant' symbols have the look of simple Chinese characters. The most unusual aspect of the use of this alphabet is that when combining the symbols to make syllables, the symbols are laid out sequentially left to right in a linear fashion as with English, while other syllables are laid out vertically. A complete word can be comprised entirely of linearly arranged syllables, entirely vertically arranged syllables, or a combination of both vertical and horizontal syllables. This dimensional variation, however, does not mean that it is necessary for the invention to handle the words significantly differently than it would handle any Western alphabet, since the way in which the symbols are laid down when making any word is linear in time, and the syllables and words are arranged ['spelled'] consistently.

The Work Screens for Hanja [the Korean 'Chinese character' set] function in the same way as the Work Screens for Chinese. And, as implied above, the Work Screens for Hangul function in the same way as the Work Screens for English. Hangul can be substituted for any Hanja that is not available in the device's computer storage; and any Hangul word that is not in the device's computer storage can be spelled out using the Manual Entry Screen which has not only the 24 basic symbols, but also both a 'down arrow' symbol to indicate that the next character entry is to be placed below the previous entry, and an 'up arrow' to indicate that the next symbol is to be placed above and to the right of the previous symbol. Use of neither arrow indicates that the next symbol is placed immediately to the right of the previous symbol. Since such placement issues during manual entry have implications for the size of the symbol as well as its location, manual entry involving these arrows will call out the appropriate symbol from computer storage, with its constituent symbols properly sized and stacked.

What is claimed is:

1. Apparatus for enabling a use r to input text into a device or system using an ideographic or non-ideographic language, said apparatus comprising:

a user input device operable by said user to successively select a series of partial words or characters, each of said partial words or characters representing a portion of a word or character that contains a larger number of letters or strokes than said portion contains, and to select complete words or characters;

a controller, responsive to said user input device, for accessing an information storage device in which said partial and complete words or characters are stored and from which they may be retrieved, said partial and complete words and characters stored according to the respective frequencies, in common usage of the language, of the letter or stroke sequences which constitute such words and characters; and a display, responsive to said controller, having at least two areas, a first one of said areas for displaying shapes of said partial and complete words or characters as they are retrieved from said storage device, and a second one of said areas for rendering a text as it is composed by said user.

2. Apparatus as in claim 1 wherein said first display area is divided into two portions, one portion for displaying a partial word or character previously selected by the user, the other portion for displaying a next successive set of candidate partial words or characters which are more complete than the previously selected partial word or character.

3. Apparatus as in claim 1 wherein said user input device includes a function to allow a user to access a word or character list based upon a partial word or character that was previously selected.

4. Apparatus as in claim 1 wherein said partial words or characters are displayed according to their respective frequencies in common usage of the language.

5. Apparatus as in claim 1 wherein said user input device comprises four cursor control keys, a select letter group or select stroke group key, and a select word or select character key.

6. Apparatus as in claim 1 wherein said user input device comprises a touch screen.

7. Apparatus as in claim 1 where said user input device includes a function for enabling the user to switch to a manual entry screen to complete a previously selected partial character or word or to explicitly specify a complete character or word.

8. A method of text input into a device or system using an ideographic or nonideographic language, said method comprising the steps of:

(a) storing each word or character of a given language in a memory according to the respective frequencies, in common usage of the language, of the letter or stroke sequences which constitute such words and characters;

(b) receiving from a user input device a selected stroke or letter representing the first stroke or letter of a desired character or word;

(c) displaying to the user one or more partial characters or words each of which begins with the previously selected stroke or letter;

(d) receiving from the user input device a selected partial character or word;

(e) displaying to the user successively more complete partial characters or words based on the previously selected partial character or word; and (f) receiving from the user input device a selected complete character or word.

* * * * *